US012436502B1

(12) United States Patent
Diamond

(10) Patent No.: US 12,436,502 B1

(45) Date of Patent: Oct. 7, 2025

(54) APPARATUS FOR DISPLAYING TIME

(71) Applicant: Marc L. Diamond, Croton-on-Hudson, NY (US)

(72) Inventor: Marc L. Diamond, Croton-on-Hudson, NY (US)

(*) Notice: Subject to any disclaimer, the term of this patent is extended or adjusted under 35 U.S.C. 154(b) by 0 days.

(21) Appl. No.: 19/047,022

(22) Filed: Feb. 6, 2025

Related U.S. Application Data

(63) Continuation-in-part of application No. 18/738,042, filed on Jun. 9, 2024.

(51) Int. Cl.
*G04B 19/22* (2006.01)

(52) U.S. Cl.
CPC ......... *G04B 19/223* (2013.01); *G04B 19/228* (2013.01)

(58) Field of Classification Search
CPC ........ G04B 19/223; G04B 19/225–228; G04B 19/28
See application file for complete search history.

(56) References Cited

U.S. PATENT DOCUMENTS 4,759,002 A 7/1988 Cash
6,901,032 B1 * 5/2005 Eo .......................... G04B 19/26 368/17
6,947,351 B1 * 9/2005 Loth ...................... G01C 17/34 368/20
7,218,575 B2 5/2007 Rosevear
7,518,956 B1 * 4/2009 Hansel ................. G04B 19/262 368/15
8,885,443 B2 * 11/2014 Marzouq .............. G04G 9/0076 368/16
9,535,402 B2 * 1/2017 Gilomen ................ G09B 27/08
11,131,967 B2 9/2021 Guzman
11,550,266 B2 1/2023 Lagorgette
(Continued)

FOREIGN PATENT DOCUMENTS

CH 715350 A2 3/2020
CH 715490 A2 4/2020
(Continued)

OTHER PUBLICATIONS

Graham Reference Guide—Geo.Graham Tourbillon Orrey (Year: 2019).*
(Continued)

*Primary Examiner* — Edwin A. Leon
*Assistant Examiner* — Jason M Collins
(74) *Attorney, Agent, or Firm* — Gallium Law; Jacob Panangat; Isabel Fox

(57) ABSTRACT

An apparatus may include a display for visually representing solar time and civil time simultaneously. In some embodiments, the apparatus includes a representation of a horizon extending across the display, an icon of the sun corresponding to a solar time by its position relative to the representation of the horizon and to a top portion of the display, the icon of the sun configured to revolve once per solar day about a center portion of the display, and a plurality of hour indications corresponding to civil-time hours of a day, the plurality of hour indications set circumferentially around the display. The angular position of the plurality of hour indications may be rotatable, thereby enabling the civil time of solar noon to appear at the top portion of the display.

20 Claims, 11 Drawing Sheets

(56) References Cited

U.S. PATENT DOCUMENTS

| | | | | |
|---|---|---|---|---|
| 2006/0164920 | A1* | 7/2006 | Brophy | G04B 19/262 368/15 |
| 2018/0004162 | A1* | 1/2018 | Capt | G04B 19/268 |
| 2018/0181069 | A1* | 6/2018 | Gilomen | G04B 19/226 |
| 2018/0181074 | A1* | 6/2018 | Gilomen | G04B 19/226 |
| 2018/0203416 | A1* | 7/2018 | Rupert | G04B 49/02 |
| 2019/0146414 | A1* | 5/2019 | Zaugg | G04B 19/268 368/16 |
| 2020/0125033 | A1* | 4/2020 | Lagorgette | G04G 21/04 |
| 2020/0218200 | A1* | 7/2020 | Sauzay | G04B 19/262 |
| 2022/0269393 | A1* | 8/2022 | Springer | G04G 21/04 |
| 2022/0365486 | A1* | 11/2022 | Willemin | G04B 19/268 |

FOREIGN PATENT DOCUMENTS

| | | | |
|---|---|---|---|
| CN | 106909056 | B | 10/2018 |
| ES | 2550255 | A1 | 11/2015 |
| WO | 2004086153 | A2 | 10/2005 |

OTHER PUBLICATIONS http://en.worldtempus.com/article/audemars-puguet-royal-oak-equation-of-time-7312.html.
https://watchguy.co.uk/the-de-fossard-solar-time-clock.
https://www.krayon.ch/everywhere.php.
https://www.blancpain.com/en/villeret/equation-temps-marchante-6638-3431-55b.
https://play.google.com/store/apps/details?id=com.ajnaware.sunseeker.
https://play.google.com/store/apps/details?id=com.andymstone.sunpositiondemo.
www.weawow.com.
www.weatherbug.com.
https://en.wikipedia.org/wiki/Equation_clock.
https://en.wikipedia.org/wiki/Mechanical_watch.
https://support.apple.com/guide/watch/faces-and-features-apde9218b440/watches.
https://apps.apple.com/us/app/daytime/id440982690.

* cited by examiner

APPARATUS FOR DISPLAYING TIME

CROSS-REFERENCE TO RELATED APPLICATIONS

The present application claims priority to U.S. Non-Provisional patent application Ser. No. 18/738,042 filed on Jun. 9, 2024, entitled "APPARATUS FOR DISPLAYING TIME" the entire disclosure of which is incorporated by reference herein.

Technical Field

The invention relates to systems displaying at least two different times, in particular to a system for displaying the passage of time by graphically representing the movement of the sun as seen from earth.

BACKGROUND

Related Art

THE SUNDIAL AND THE MECHANICAL CLOCK: Early mechanical clocks, which were introduced centuries after the first sundials, included a dial with 24 hours, which represented one day. Each hour accounted for 1/24 or 15 degrees of the dial. The numbering on the dial was divided into two 12-hour sets. However, the relationship of the 12-hour sets to daytime and nighttime that is present in the sundial, where the sets of 12 hours begin at sunrise and at sunset, was lost in mechanical clocks. The 12-hour groupings instead began at midnight and at noon. Further evolution of the mechanical clock yielded a dial with just 12 hours around its circumference, representing half of a day.

SOLAR DAY VS. SIDEREAL DAY: The solar day is the time between solar noon on one day and solar noon on the next day, where solar noon is the time at which the sun is directly overhead as seen from a specific point on earth.

The time it takes for the earth to make a single rotation on its axis with respect to distant stars is the sidereal day. The time it takes for the earth to rotate a sidereal day plus a small amount more—enough for the same location on earth to face the sun again—is the solar day.

VARIATION OF THE SOLAR DAY: Throughout the year, every solar day does not have equal length. This is due to two geometric properties of the earth's orbit about the sun.

The first property that affects the length of the solar day is the elliptical, rather than circular, orbit of the earth. In a circular orbit, the angular speed of a celestial body is constant. But as the earth revolves in its elliptical orbit, the speed along its orbit varies, and this causes the distance that the earth travels in its orbit each day to also vary.

The variation in the distance that the earth travels in its orbit each day causes a variation in the additional amount of rotation—enough for the same location on earth to face the sun again—that is needed to complete a solar day. Thus, the length of the solar day has a variation through the year that is related to where the earth is in its elliptical orbit about the sun.

The second geometric property that affects the length of the solar day is the tilt in the angle of the earth's rotation about its axis relative to the plane of the earth's revolution about the sun.

The plane of the earth's orbit is called the ecliptic. Since the sun's apparent rotation across the sky is at an angle that is tilted from the ecliptic, the component of that rotation that is parallel with the ecliptic—which is equivalent to the apparent speed of the sun in the earth's east-west direction—is not the same every day of the year.

EQUATION OF TIME: The sum of these two variations in the length of the solar day is called the equation of time, where the term "equation" is used in its medieval sense of a difference or correction between two values. The equation of time is the number of minutes that civil time will be ahead or behind solar time for each day of the year. Civil time is an invented simplification of the earth's natural motions and is based on the average length of a solar day through the course of a year. This average is 24 hours. Through the year, civil time will vary from solar time within a range of approximately 14 minutes ahead of solar time to 16 minutes behind solar time. On four days each year, the equation of time is zero; that is, on four days each year, civil time is coincident with solar time.

EFFECT OF TIME ZONES: The earth has been artificially segmented into time zones. In principle, there are 24 time zones, each with a width of 15 degrees of earth's longitude. In practice, there are variations in the borders of time zones away from the longitude lines; so, in many locations, the width of a time zone is more or less than 15 degrees. At the center of each time zone is its meridian, which is the longitude at which the time for that time zone is based.

Solar noon occurs when the sun is directly overhead. Therefore, to relate solar time to civil time at any location, it is necessary to know the longitude of the location.

ASSOCIATING SOLAR TIME TO CIVIL TIME: To determine the solar time of a location from its civil time, up to three adjustments to civil time are required. The first adjustment is based on the number of degrees of longitude that the location is offset from the meridian of the location's time zone. A second adjustment is required if a location is observing Daylight Saving Time. The third adjustment accounts for the equation of time, which is a function of the variation in the length of the solar day through the year. The equation of time provides the number of minutes each day that must be added to or subtracted from civil time to determine solar time, in order to account for the inconstant length of the solar day through the year.

RELATED ART: Historically, as well as currently on the market, mechanical clocks and watches present the varying difference between solar time and civil time using different strategies. Examples include:

A. The Royal Oak Equation of Time mechanical watch (2010) by the company Audemars Piguet of Switzerland at http://www.audemarspiguet.com/com/en/watch-collection/royal-oak/26603OR.OO.D092CR.01.html [accessed June 2024] with explanation at http://en.worldtempus.com/article/audemars-piguet-royal-oak-equation-of-time-7312.html [accessed June 2024]

B. The Solar Time Clock (2017) by the company de Fossard of the United Kingdom, at http://www.defossard.co.uk/portfolio/the-solar-time-clock [accessed June 2024] with explanation at https://watchguy.co.uk/the-de-fossard-solar-time-clock [accessed June 2024]

C. The Everywhere mechanical watch (2017) by the company Krayon of Switzerland at https://www.krayon.ch/everywhere.php [accessed June 2024]

D. The Villeret Running Equation of Time mechanical watch by the company Blancpain of Switzerland at https://www.blancpain.com/en/villeret/equation-temps-marchante-6638-3431-55b [accessed June 2024]

E. U.S. Pat. No. 4,759,002 by Cash of the United States

F. U.S. Pat. No. 6,901,032 by Eo et al of South Korea
G. U.S. Pat. No. 7,218,575 by Rosevear of the United States
H. U.S. patent Ser. No. 11/131,967 by Aurelio Guzman of the United States et al for U.S. digital watch manufacturer Apple Inc.
J. WIPO Pat. No. 2004086153A2 by Moulard of France
K. Chinese Pat. No. 106909056B by Zhenzhou et al of China for Chinese company Tianjin Sea-Gull Watch Group Co Ltd
L. Swiss Pat. No. 715350A2 by Menoud et al for Swiss company Haldi & Menoud Sarl
M. Swiss Pat. No. 715490A2 by Lagorette of Switzerland for Swiss mechanical watch movement manufacturer ETA SA Mft. Horlogere Suisse, later granted as U.S. patent Ser. No. 11/550,266
N. Spanish Pat. No. 2550255A1 by Alejandro of Spain for Corus Land S L U
P. The smartphone app Sun Seeker, at https://play.google.com/store/apps/details?id=com.ajnaware.sunseeker [accessed June 2024]
Q. the smartphone app DayTime, at https://apps.apple.com/us/app/daytime/id440982690 [accessed June 2024]
R. the smartphone app Sun Position, at https://play.google.com/store/apps/details?id=com.andymstone.sunpositiondemo [accessed June 2024]
S. the Sun and Moon diagram on the website and smartphone app Weawow (weawow.com) and on the smartphone app WeatherBug (weatherbug.com) [both accessed June 2024]

In Examples A through J, there is no representation of a horizon. In Examples K through N, there is a horizon but the horizon is either stationary or civil noon rather than solar noon is at the top of the display, which causes the implied times of sunrise and sunset to be diagrammatic approximations; that is, they will be inaccurate by up to 30 minutes or more due to longitude and up to 16 minutes additionally each day due to the equation of time. Examples P, Q, and R are digital simulations that imitate actual views, rather than geometric abstractions that take an inventive leap to describe three-dimensional movement in a two-dimensional display. They do not include a sun rotating about a stationary center and they do not include a horizon that translates vertically. In Example S, the apparent proportion of daytime and nighttime is constant through the year, and thus not representative of any location on earth.

Other distinguishing characteristics among the related-art examples include a lack of user-adjustable latitude and longitude; no indication of sunrise and sunset times; indications of the times of sunrise and sunset and the equation of time that are on displays that are separate from the display that indicates the time of day; non-adjustable indications of the hours and minutes; and lack of a 24-hour dial. Additionally, there are instances of wall clocks on the market that have images of horizons, but the horizon has no function; the horizon is artwork behind a time display.

The following web pages and publications are incorporated herein in their entirety by reference:

i) https://en.wikipedia.org/wiki/Equation_clock [accessed June 2024]
ii) https://en.wikipedia.org/wiki/Mechanical_watch [accessed June 2024]
iii) https://support.apple.com/guide/watch/faces-and-features-apde9218b440/watchos [accessed June 2024].

RELATED ART CONCLUSION: The evolution of timekeeping devices and conventions has caused a disassociation of timekeeping from the natural movements of the earth and of the sun as seen from the earth. The rotations of the hour and minute hands of our analog clock no longer relate to the motions of the sun and earth, as the shadow of a sundial naturally does. Our analog clock is not immediately understandable without explanation and does not provide an understanding of the current time within the context of the day, as does the sundial.

Among related art that includes a representation of the sun that revolves once per day and a representation of a horizon, there is no system that includes elements that are essential to distinguishing the system as more than a diagrammatic approximation with periods of error of up to three-quarters of an hour or more, and instead as a system that has the potential for accuracy within minutes or less, and thus attains a new utility. The elements are:

a representation of a sun that revolves once per solar day, not once per civil-time day;
an hour dial that can assume different angular positions to enable solar noon, not civil-time noon, to be at the top of the display, which results in the position of civil-time noon at various angular positions dependent on the system's longitude, Daylight Saving Time status, and the equation of time for that day of the year; and,
a horizon that oscillates vertically with an annual period, not radial indications of sunrise and sunset whose angles adjust through the year.

Accordingly, there is a need for a system that displays the passage of time as we experience the movement of the sun;
indicates civil time and solar time in a single, integrated display;
indicates the time of solar noon at the top of the display;
displays the time in relation to the times of sunrise, solar noon, and sunset;
indicates the time, the date, equinoxes and solstices, and seasons in a single, integrated display;
accounts for all the naturally perceptible motions of the earth with respect to the sun in a single, integrated display; and,
reconnects the display of time with the way in which people naturally experience the passage of time on earth.

SUMMARY OF THE INVENTION

The disclosure includes an apparatus including a display for visually representing solar time and civil time simultaneously. In some embodiments, the apparatus includes a representation of a horizon extending across the display, an icon of the sun corresponding to a solar time by its position relative to the representation of the horizon and to a top portion of the display, the icon of the sun configured to revolve once per solar day about a center portion of the display, and a plurality of hour indications corresponding to civil-time hours of a day, the plurality of hour indications set circumferentially around the display. The angular position of the plurality of hour indications may be rotatable, thereby enabling the civil time of solar noon to appear at the top portion of the display.

In some embodiments, the icon of the sun indicates civil time by its position relative to the plurality of hour indications and when the icon of the sun is located above the representation of the horizon, the apparatus indicates daytime. The representation of the horizon may extend substantially horizontally across the display and may define a first end and a second end located opposite the first end. In some embodiments, a position of the first end relative to the plurality of hour indications corresponds to the civil time of sunrise, and a position of the second end relative to the plurality of hour indications corresponds to the civil time of sunset.

The apparatus may include a bottom portion of the display located opposite the top portion of the display. An area between the representation of the horizon and the top portion of the display relative to the area between the representation of the horizon and the bottom portion of the display may represent a proportion of daytime to nighttime each day. In some embodiments, the representation of the horizon moves toward the top portion of the display, reverses direction, and moves toward the bottom portion of the display within an annual period, thereby causing a progression through a year in the proportion of daytime and nighttime of each day depicted on the display and in the indicated civil times of sunrise and sunset for each day. The apparatus may include a means for a digital portion of the apparatus, wherein positions and movements of the icon of the sun, the plurality of hour indications, and the representation of the horizon may be guided by the means of the digital portion.

In some embodiments, the apparatus includes a radially oriented graphic that is visible in daytime and in nighttime that revolves with a position that is substantially the same angular position as the icon of the sun, thereby allowing continuous determination of civil time by the position of the radially oriented graphic relative to the plurality of hour indications. The angular position of the plurality of hour indications may be rotated to adjust for the longitude of an actual location relative to the meridian of the time zone corresponding to the actual location. In some embodiments, the apparatus includes a dial accessible to a user, wherein adjusting the dial sets the longitude of the apparatus by adjusting the angular position of the plurality of hour indications.

The angular position of the plurality of hour indications may be rotated to adjust for the equation of time each day. In some embodiments, the angular position of the plurality of hour indications is further rotated to conform to the equation of time each day. During Daylight Saving Time, the angular position of the plurality of hour indications may be further rotated $1/24$ circle, thereby causing the civil times of sunrise, solar noon, and sunset on the apparatus to be one hour later than their civil times during Standard Time. In some embodiments, the apparatus includes a dial accessible to a user, wherein adjusting the dial moves between a Daylight Saving Time setting and a Standard Time setting by adjusting the angular position of the plurality of hour indications.

The amplitude of vertical translation of the representation of the horizon may be based on the latitude of an actual location, thereby causing the civil times of sunrise and sunset on the apparatus to vary through a year with the same magnitude of variation as the actual civil times of sunrise and sunset at the actual location. In some embodiments, the apparatus includes a plurality of date indications displayed circumferentially about the center portion of the display and a representation of earth's position in its orbit that corresponds to a date by its position relative to the plurality of date indications. In some embodiments, the representation of earth's position in its orbit revolves approximately once per year about the center portion of the display.

In some embodiments, an indication of winter solstice is located adjacent to the top portion of the display, an indication of spring equinox and an indication of fall equinox are each at an angular position that is substantially equally spaced between the top portion of the display and the bottom portion of the display, the indication of spring equinox is located opposite the indication of fall equinox, and an indication of summer solstice is located adjacent to the bottom portion of the display. A label of each season may be placed circumferentially between the solstice or the equinox that begins each season and the equinox or the solstice that ends each season.

In some embodiments, an angular position of the plurality of date indications is slightly rotated annually to adjust for a year within a leap cycle, and is slightly rotated to adjust for the time zone of an actual location, thereby causing the date plus fraction of a day of the spring equinox of a current year, as located within the plurality of date indications, to be coincident with the angular position of the indication of the spring equinox. An angular position of the representation of the earth's position in its orbit may be geared to affect a vertical position of the representation of the horizon, thereby positioning the representation of the horizon at the vertical position appropriate to a date represented by the angular position of the representation of the earth's position in its orbit.

In some embodiments, the varying magnitude of change each day in the angular position of the representation of earth's position in its orbit is equal to the varying magnitude of change each day in the angular position of the earth in its orbit around the sun, thereby causing a more accurate vertical positioning of the representation of the horizon appropriate to a date represented by the angular position of the representation of the earth's position in its orbit. The apparatus may include a dial accessible to a user, wherein adjusting the dial may change a setting of a latitude of the apparatus by adjusting a radius of revolution of a pin around the center, wherein the vertical component of a distance of the pin from the center portion of the display may be geared to affect a vertical position of the representation of the horizon.

The foregoing, and other features and advantages of the invention, will be apparent from the following, more particular description of the preferred embodiments of the invention, the accompanying drawings, and the claims.

BRIEF DESCRIPTION OF DRAWINGS

These and other features, aspects, and advantages are described below with reference to the drawings, which are intended to illustrate, but not to limit, the invention. In the drawings, like characters denote corresponding features consistently throughout similar embodiments.

DETAILED DESCRIPTION OF THE INVENTION

Figure 1:
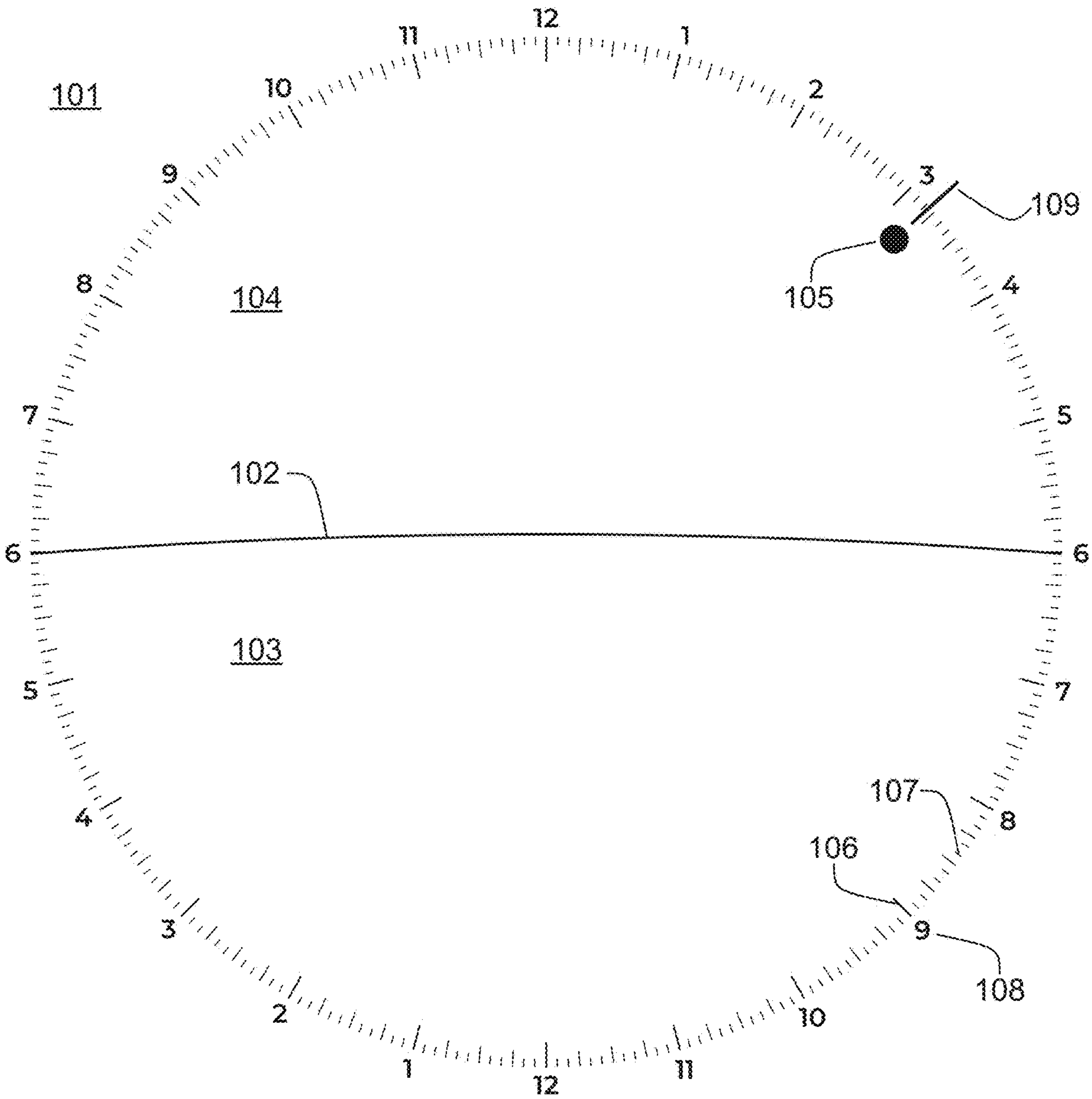
FIG. 1 is a diagram illustrating a portion of a system for graphically representing the passage of time, according to an embodiment of the present invention.

FIG. 1 is a diagram illustrating a portion of a system for graphically representing the passage of time, according to an embodiment of the present invention. A Face 101 contains a Horizon 102 that defines the upper edge of an Earth Layer 103 that is situated below a Sky 104. A Sun 105 revolves about a center once per solar day. Circumferentially placed about the center of rotation of Sun 105 are Hour Indications 106 that represent clock-time hours of a day. Between Hour Indications 106 are Hour Segments 107 that divide each hour into segments of an hour. Identifying the hours of the day are Hour Numerals 108 that are associated with each Hour Indication 106. The position of Sun 105 with respect to Hour Indications 106 and Hour Segments 107 indicates the time of day. A Rotating Line 109 revolves in tandem with Sun 105 and further identifies the time of day with respect to Hour Indications 106 and Hour Segments 107.

FIG. 2A, FIG. 2B, FIG. 2C, and FIG. 2D are diagrams illustrating a portion of the system in which the position of Sun 105 makes one rotation about the center in one solar day, according to an embodiment of the present invention.

Figure 2A:
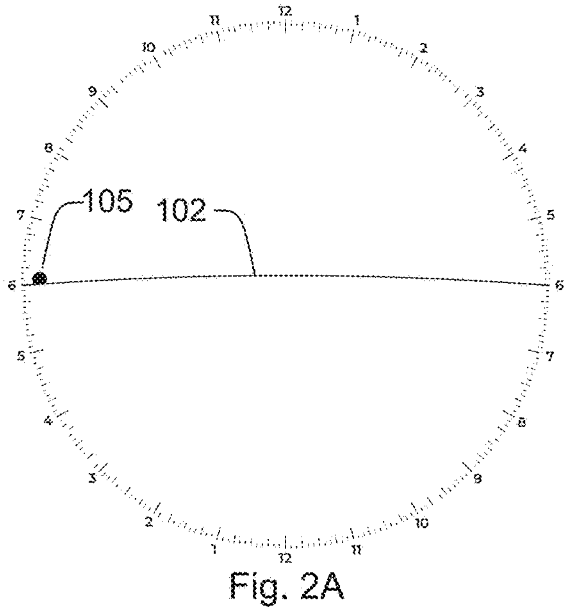
FIG. 2A is a diagram illustrating a portion of a system for graphically representing the passage of time, during a representation of sunrise, according to an embodiment of the present invention.

FIG. 2A is a diagram of the system during a representation of sunrise. Sun 105 has revolved clockwise from its position in FIG. 1 and is crossing Horizon 102 in an upward direction, an occurrence that represents sunrise.

Figure 2B:
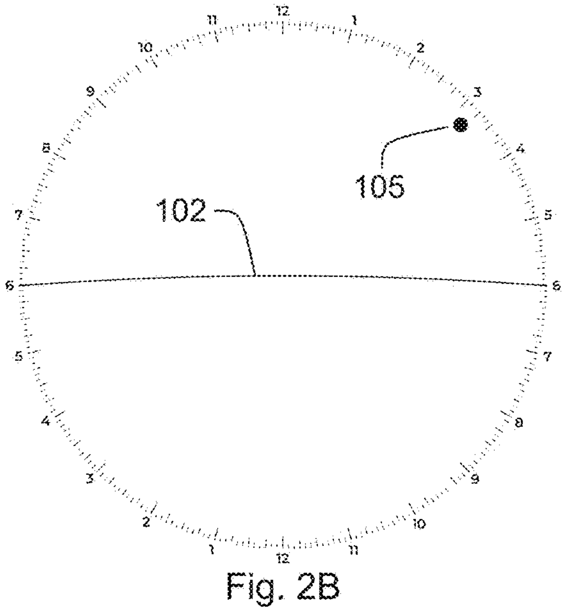
FIG. 2B is a diagram illustrating a portion of a system for graphically representing the passage of time, during daytime, according to an embodiment of the present invention.

FIG. 2B is a diagram of the system during the period of a day between sunrise and sunset, according to an embodiment of the present invention. Sun 105 has revolved clockwise from its position in FIG. 2A and is in a position above Horizon 102, which represents daytime.

Figure 2D:
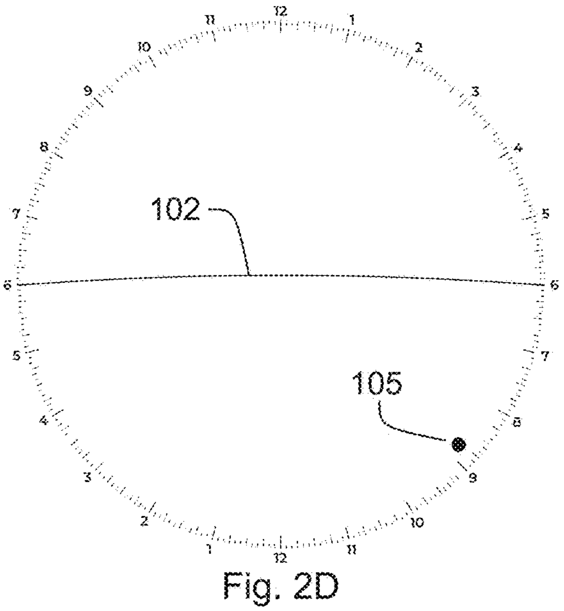
FIG. 2D is a diagram illustrating a portion of a system for graphically representing the passage of time, during nighttime, according to an embodiment of the present invention.
Figure 2C:
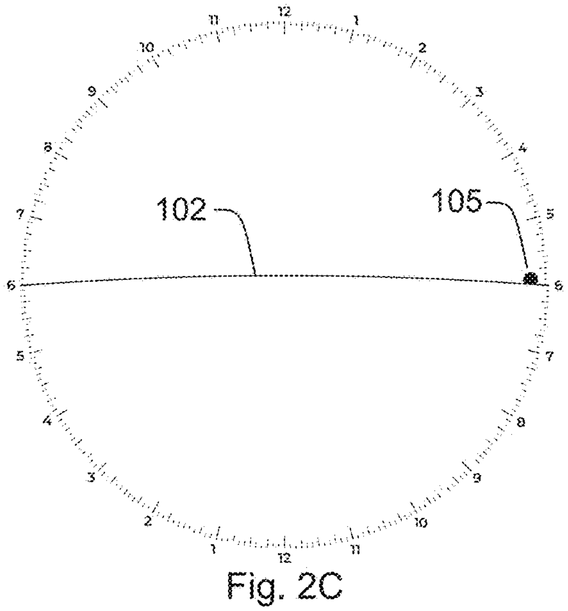
FIG. 2C is a diagram illustrating a portion of a system for graphically representing the passage of time, during a representation of sunset, according to an embodiment of the present invention.

FIG. 2C is a diagram of the system during a representation of sunset, according to an embodiment of the present invention. Sun 105 has revolved from its position in FIG. 2B and is crossing Horizon 102 in a downward direction, an occurrence that represents sunset.

FIG. 2D is a diagram of the system during the period of a day between sunset and sunrise, according to an embodiment of the present invention. Sun 105 has revolved from its position in FIG. 2C and is in a position below Horizon 102, which represents nighttime.

FIG. 3A, FIG. 3B, FIG. 3C, and FIG. 3D are diagrams illustrating a portion of the system in which the position of Horizon 102 translates up and down through the year, according to an embodiment of the present invention.

Figure 3A:
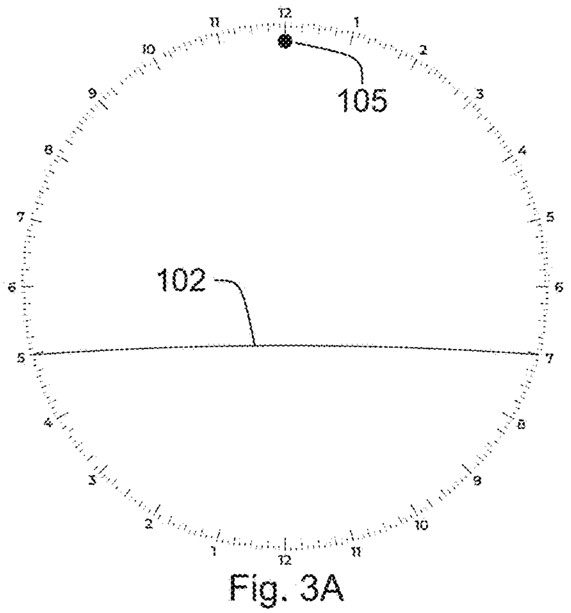
FIG. 3A is a diagram illustrating a portion of a system for graphically representing the passage of time, during a day that includes the summer solstice, according to an embodiment of the present invention.

FIG. 3A is a diagram of the system during a day that includes the summer solstice. Horizon 102 has translated vertically downward from its position in FIG. 1 and is at the low point of its vertical translation within the system. The vertical translation of Horizon 102 has a period of one year, during which it travels from a low point to a high point and back to the low point. During the year, Sun 105 is at its highest altitude above Horizon 102 at the solar noon nearest to the summer solstice, as illustrated in FIG. 3A, on the system as in reality.

Figure 3B:
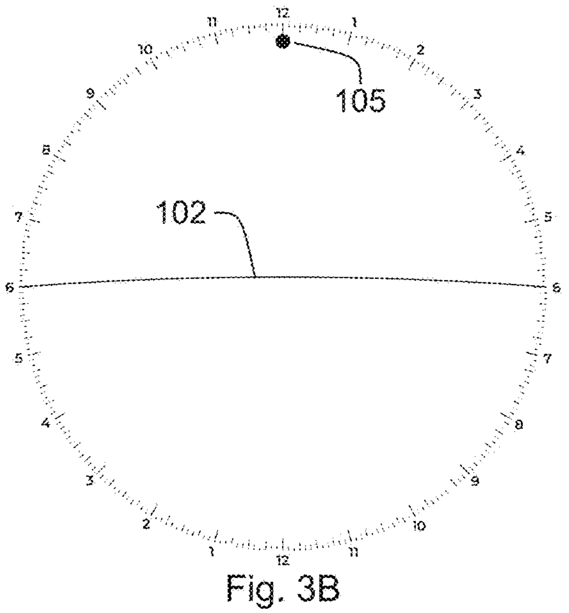
FIG. 3B is a diagram illustrating a portion of a system for graphically representing the passage of time, during a day that includes the fall equinox, according to an embodiment of the present invention.

FIG. 3B is diagram of the system during a day that includes the fall equinox. Horizon 102 has translated upward from its position in FIG. 3A and is at the midpoint of the range of its vertical translation during the year.

Figure 3D:
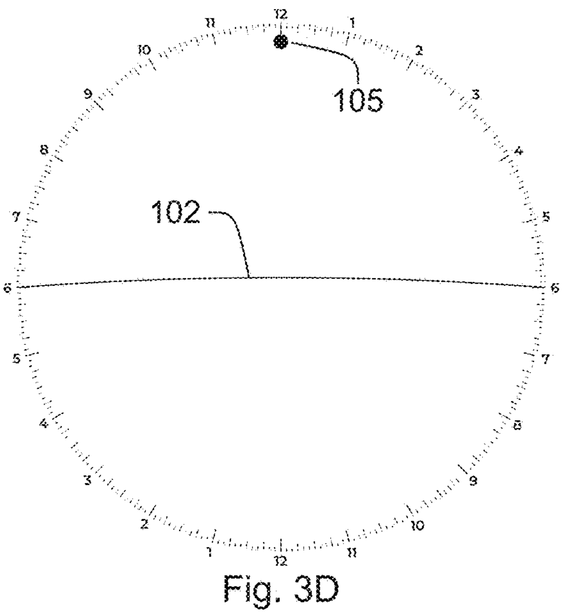
FIG. 3D is a diagram illustrating a portion of a system for graphically representing the passage of time, during a day that includes the spring equinox, according to an embodiment of the present invention.
Figure 3C:
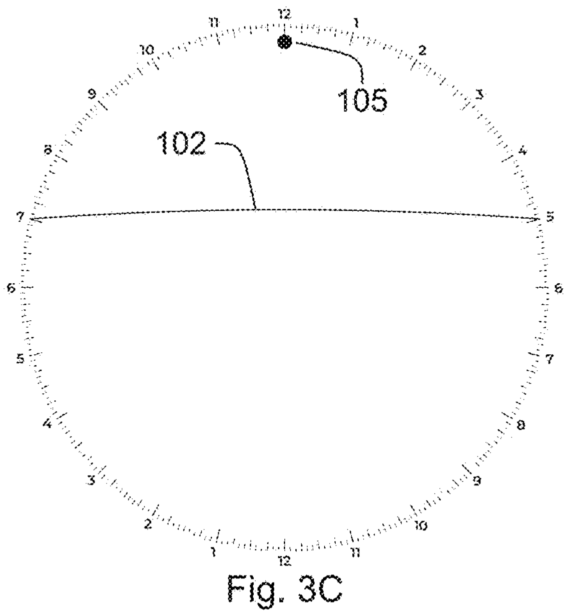
FIG. 3C is a diagram illustrating a portion of a system for graphically representing the passage of time, during a day that includes the winter solstice, according to an embodiment of the present invention.

FIG. 3C is a diagram of the system during a day that includes the winter solstice. Horizon 102 has translated upward from its position in FIG. 3B and is at the high point of its vertical translation during the year. During the year, Sun 105 is at its lowest altitude above Horizon 102 at the solar noon nearest to the winter solstice, as illustrated in FIG. 3C, on the system as in reality.

FIG. 3D is a diagram of the system during a day that includes the spring equinox. Horizon 102 has translated downward from its position in FIG. 3C and is at the midpoint of the range of its vertical translation during the year.

After the spring equinox, as illustrated in FIG. 3D, Horizon 102 continues to translate downward until the summer solstice, when it reaches the low point of its vertical translation during the year, as illustrated in FIG. 3A.

Figure 4A:
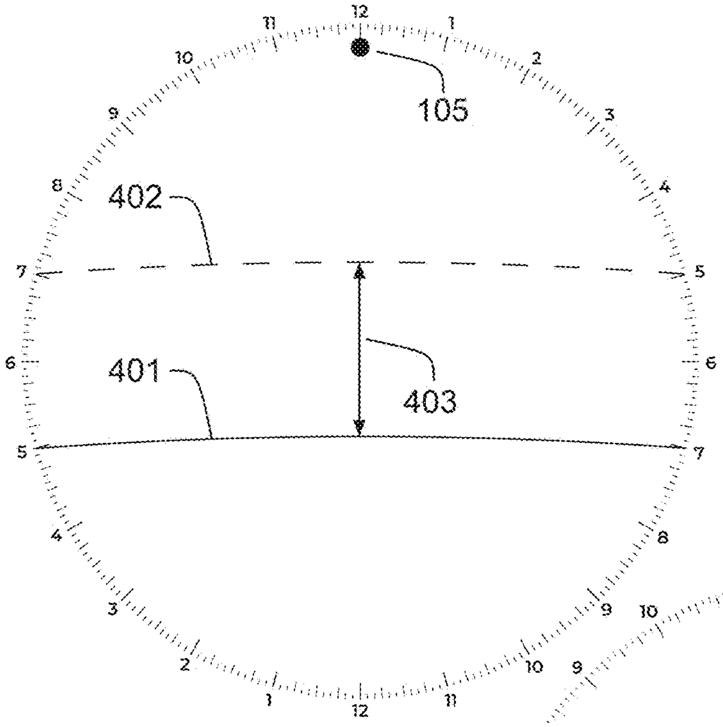
FIG. 4A is a diagram illustrating a portion of a system for graphically representing the passage of time, at a latitude that is closer to the equator than it is to the earth's poles, according to an embodiment of the present invention.
Figure 4B:
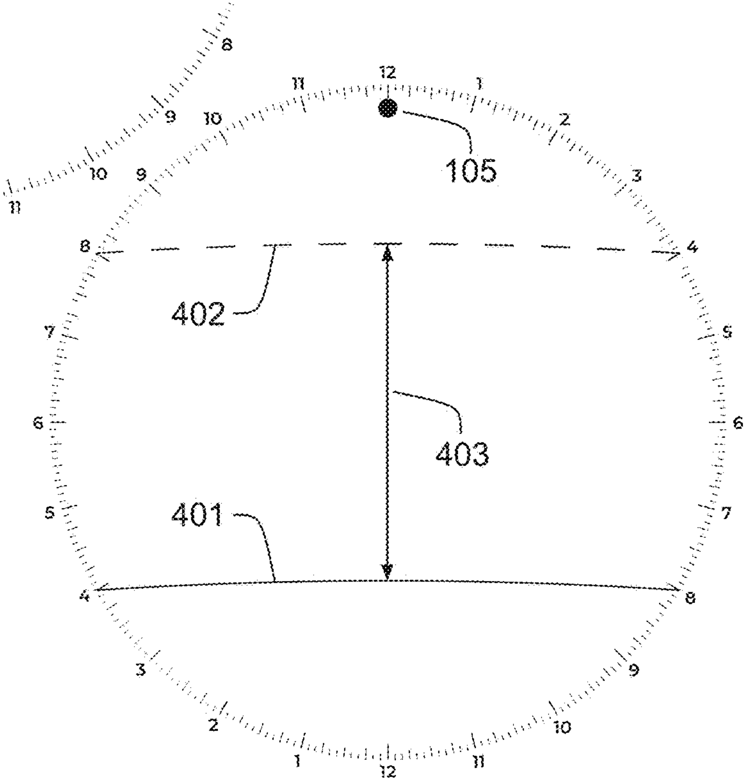
FIG. 4B is a diagram illustrating a portion of a system for graphically representing the passage of time, at a latitude that is closer to one of the earth's poles than it is to the equator, according to an embodiment of the present invention.

FIG. 4A and FIG. 4B are diagrams of the system that represent the system's positioning at different latitudes, according to an embodiment of the present invention.

In FIG. 4A and in FIG. 4B, an Arc 401 represents the position of the horizon at the summer solstice and a Dashed Arc 402 represents the position of the horizon at the winter solstice. FIG. 4A illustrates the magnitude of translation of the horizon when the system represents a location at a low latitude, such as a latitude that is closer to the equator than to the north or south pole. In contrast, FIG. 4B illustrates the magnitude of translation of the horizon when the system represents a location at a high latitude, such as a latitude that is closer to one of the poles than to the equator. In both figures, a Distance 403 represents the amplitude of vertical translation of the horizon. Distance 403 is greater at the higher latitude illustrated in FIG. 4B than it is at the at lower latitude illustrated in FIG. 4A. Since the position of the horizon on the system affects the times of sunrise and sunset, the variation in the times of sunrise and sunset throughout the year is greater at higher latitudes than it is at lower latitudes, on the system as in reality. Additionally, the variation throughout the year in the altitude of Sun 105 above the horizon at solar noon each day is greater at higher latitudes than it is at lower latitudes, on the system as in reality.

The means for a digital portion of the claimed invention comprises an electronic portion and, optionally, an associated mechanical portion. An electronic portion of a digital portion comprises a computing means and memory means, such as a CPU and operating system and associated memory types such as RAM and programable memory. In an embodiment, a means for a digital program guides the positions and movements of the Sun, Horizon, and Hour Indications. Date, time, longitude, latitude, and time zone are known based on user input or on information provided by other applications on the digital program's operating system, such as a clock, GPS interface, or other time- or location-aware applications. A program comprises an algorithm, to which is provided the inputs of date, time, longitude, latitude, and time zone and calculates the coordinates of the positions of the Sun, Horizon, and Hour Indications. These elements are positioned based on calculated coordinates and updated at regular intervals, such as once per second or once per minute or as needed. One knowledgeable with electronic time pieces, mechanical time pieces, electronic watches and mechanical watches will be familiar with the requirements for a digital portion.

Figure 5A:
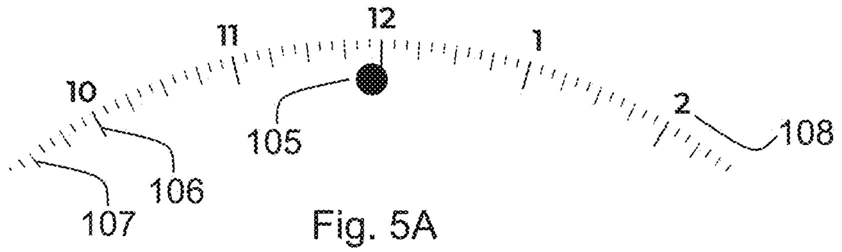
FIG. 5A is a diagram illustrating a portion of a system for graphically representing the passage of time, in which the hour indications are adjusted based on the system's longitude, at a longitude that is east of the meridian of the system's time zone, according to an embodiment of the present invention.
Figure 5B:
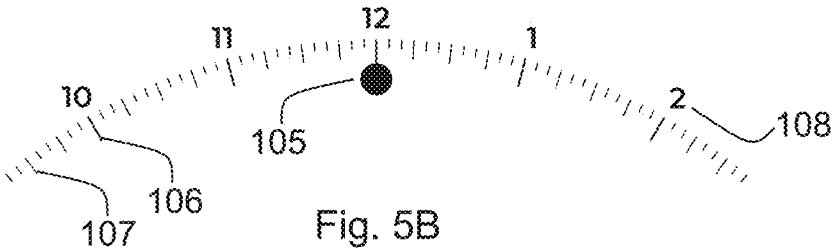
FIG. 5B is a diagram illustrating a portion of a system for graphically representing the passage of time, in which the hour indications are adjusted based on the system's longitude, at a longitude that is equal to the meridian of the system's time zone, according to an embodiment of the present invention.
Figure 5C:
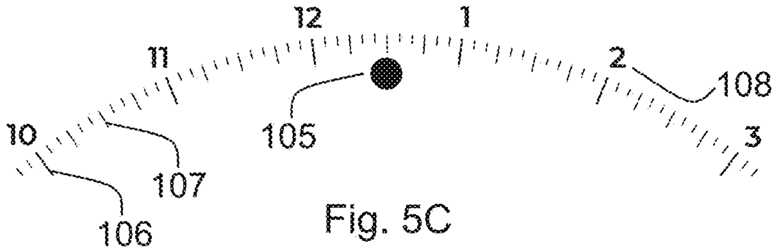
FIG. 5C is a diagram illustrating a portion of a system for graphically representing the passage of time, in which the hour indications are adjusted based on the system's longitude, at a longitude that is west of the meridian of the system's time zone, according to an embodiment of the present invention.

FIG. 5A, FIG. 5B, and FIG. 5C are diagrams of the system in which Hour Indications 106, Hour Segments 107, and Hour Numerals 108 are adjusted based on the system's longitude, according to an embodiment of the present invention.

In FIG. 5A the system represents a location one degree east of the meridian of the location's time zone. For each degree of longitude that a location is offset to the east of the meridian of its time zone, sunrise, solar noon, and sunset occur at a civil time that is four minutes earlier than they do at the meridian. Hour Indications 106, Hour Segments 107, and Hour Numerals 108 have been rotated clockwise one degree, or four minutes of time, from their position in FIG. 1. The civil time of 11:56 am is at the top of the clock, and is the time of solar noon in this illustration.

In FIG. 5B the system represents a location at the meridian of the system's time zone. No adjustment for longitude to the angular positions of Hour Indications 106, Hour Segments 107, and Hour Numerals 108 is necessary, and so they have not been rotated from their position in FIG. 1. The civil time of 12:00 pm is at the top of the clock, and is the time of solar noon in this illustration.

In FIG. 5C the system represents a location seven and one half degrees west of the meridian of the system's time zone. For each degree of longitude that a location is offset to the west of the meridian of its time zone, sunrise, solar noon, and sunset occur at a civil time that is four minutes later than they do at the meridian. Hour Indications 106, Hour Segments 107, and Hour Numerals 108 have been rotated counterclockwise seven and one half degrees, or 30 minutes of time, from their position in FIG. 1. The civil time of 12:30 pm is at the top of the clock, and is the time of solar noon in this illustration.

In an optional mechanical embodiment, a dial adjustable by a user causes the setting of the longitude of the system by causing an angular rotation of the hour indications. This gearing is similar to the setting of the hands of a common analog watch or clock and is well known to people skilled in the art of horology.

Figure 6:
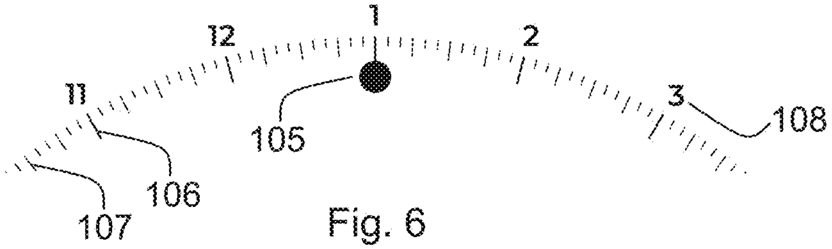
FIG. 6 is a diagram illustrating a portion of a system for graphically representing the passage of time, during Daylight Saving Time, according to an embodiment of the present invention.

FIG. 6 is a diagram illustrating a portion of the system during Daylight Saving Time, according to an embodiment of the present invention. Hour Indications 106, Hour Segments 107, and Hour Numerals 108 have rotated counterclockwise from their position in FIG. 1 one-twenty-fourth of a circle, or 15 degrees, or one hour of time. The civil time of 1:00 pm is at the top of the clock, and is the time of solar noon in this illustration.

In an optional mechanical embodiment, a dial adjustable by a user causes the setting of Daylight Saving Time or Standard Time by causing the rotation of the hour indications by the equivalent of an hour, or 15 degrees. This gearing is similar to the setting of the hands of a common analog watch or clock and is well known to people skilled in the art of horology.

Figure 7A:
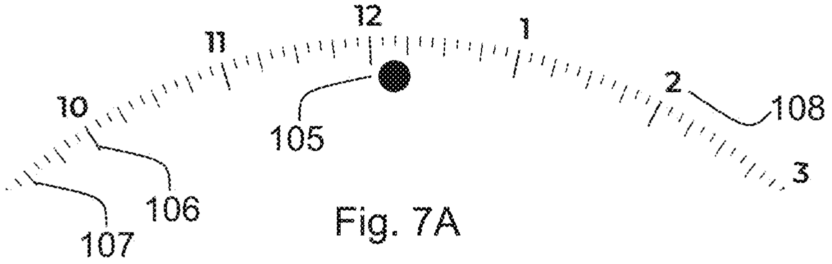
FIG. 7A is a diagram illustrating a portion of a system for graphically representing the passage of time, in which the hour indications are adjusted each day based on the equation of time, during a day when the equation of time indicates that solar noon occurs later than clock noon, according to an embodiment of the present invention.
Figure 7B:
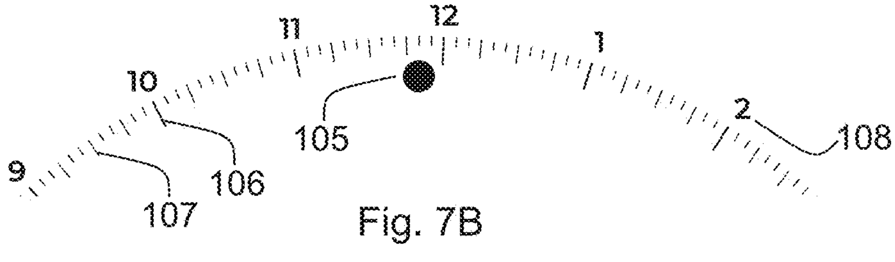
FIG. 7B is a diagram illustrating a portion of a system for graphically representing the passage of time, in which the hour indications are adjusted each day based on the equation of time, during a day when the equation of time indicates solar noon occurs earlier than clock noon, according to an embodiment of the present invention.

FIG. 7A and FIG. 7B are diagrams illustrating a portion of the system in which Hour Indications 106, Hour Segments 107, and Hour Numerals 108 are adjusted each day based on the equation of time, according to an embodiment of the present invention. For each minute of adjustment required by the equation of time, Hour Indications 106, Hour Segments 107, and Hour Numerals 108 are rotated one-quarter of a degree, or one minute of time.

FIG. 7A is a diagram of the system during a day when the equation of time indicates that solar noon will be at a civil time that is later than clock noon. In this illustration, the difference is ten minutes, therefore Hour Indications 106, Hour Segments 107, and Hour Numerals 108 are rotated counterclockwise two and a half degrees, or ten minutes of time. The civil time of 12:10 pm is at the top of the clock, and is the time of solar noon in this illustration.

FIG. 7B is a diagram of the system during a day when the equation of time indicates that solar noon will be at a civil time that is earlier than clock noon. In this illustration, the difference is ten minutes, therefore Hour Indications 106, Hour Segments 107, and Hour Numerals 108 are rotated clockwise two and a half degrees, or ten minutes of time. The civil time of 11:50 am is at the top of the clock, and is the time of solar noon in this illustration.

In an optional mechanical embodiment the system effects an adjustment to the angular position of the hour indications based on the current equation of time. A gear whose shape is determined by the value of the equation of time through the year, and which is generally kidney-shaped, rotates approximately once per year and causes the hour indications to adjust their angular position appropriately to reflect the current offset of civil time with respect to solar time. An adjustment to a portion of a time display that is generated by an equation-of-time gear is well known to people skilled in the art of horology.

Figure 8:
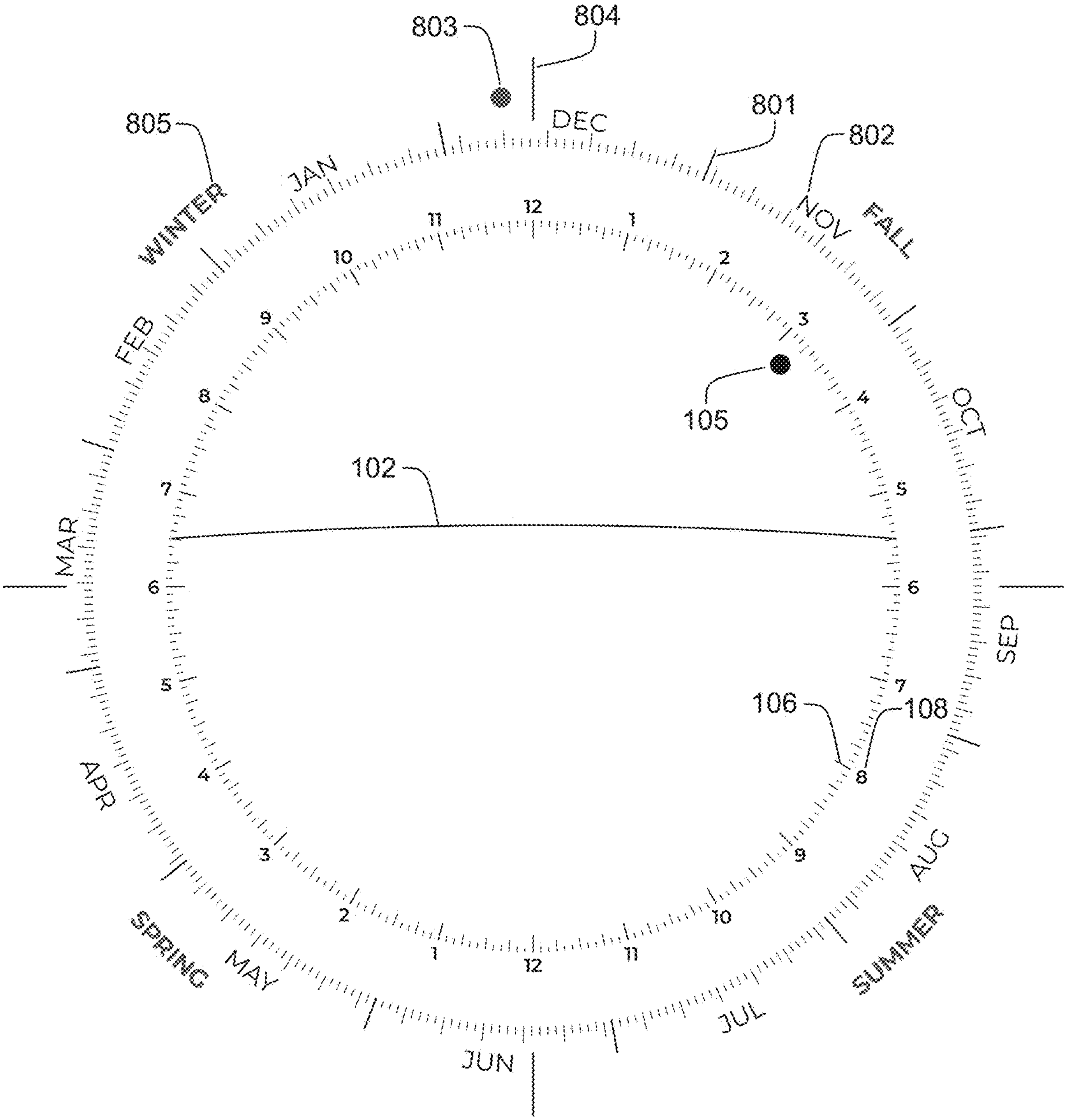
FIG. 8 is a diagram illustrating a portion of a system for graphically representing the passage of time, and including indications of dates, solstices, equinoxes, and seasons positioned relative to the vertically translating horizon, according to an embodiment of the present invention.

FIG. 8 is a diagram illustrating a portion of the system in which Date Indications 801 and Month Names 802 are arrayed circumferentially about the center of the system, according to an embodiment of the present invention. Season Names 805 are set circumferentially between Solstice and Equinox Lines 804, with the winter solstice at the top of the system, the summer solstice at the bottom, and the equinoxes positioned to the sides, midway between the solstices. An Earth 803 revolves around the center approximately once per year. The position of Earth 803 relative to Date Indications 801 and Month Names 802 indicates the date. The position of Earth 803 relative to Season Names 805 and Solstice and Equinox Lines 804 indicates the season and the occurrences of solstices and equinoxes.

In an optional mechanical embodiment, the system includes a gear train that mediates between a daily rotation and an annual rotation, thereby linking the daily rotation of the sun with the annual rotation of the earth. Gear trains that accomplish this transition are well known to people skilled in the art of horology.

The angular position of the set of Date Indications 801 and Month Names 802 is slightly adjustable in order to position the correct date plus fraction of a day of each solstice and equinox at the Solstice and Equinox Lines 804, as the dates plus fractions of a day are not the same for every location on earth, nor constant every year, but are affected by the longitude of the system and the current year within the leap cycle.

In an optional mechanical embodiment, an angle equal to approximately one-quarter of a day is added to the angle between the indications of February 28 and March 1, thereby resulting in a total of 365 and one-quarter days for the duration of the earth's full revolution on the system, which approximately matches the actual earth's revolution around the sun of just under 365 and one-quarter days. This adjustment removes the necessity to adjust the system for leap days.

In an optional mechanical embodiment, the angular position of the set of 365 date indications is slightly adjusted annually to account for the differing positions that the earth occupies within its orbit for each year of the leap cycle. More specifically, in each non-leap year, the set of date indications is rotated the equivalent of one-quarter of a day backward, or in the direction opposite to the revolution of the earth, so that the date indications meet the position of the earth on each date of that year. In each leap year, a retrograde gear rotates the set of date indications forward, or in the direction of the revolution of the earth, three-quarters of a day on February 29, thereby causing the date indication of February 28 to be indicated for a second consecutive day, thereby accounting for leap day. This adjustment removes the necessity to adjust the system for leap days. The gearing of a retrograde mechanism, which allows for forward movement in steps followed by the return to an original position, is well known to people skilled in the art of horology.

In an optional mechanical embodiment, a dial adjustable by a user causes a slight adjustment of the date indications relative to the radial solstice and equinox indications by adjusting the angular position of the date indications to account for the time zone of the actual location represented by the system and for the year within the leap cycle. This gearing is similar to the setting of the hands of a common analog watch or clock and is well known to people skilled in the art of horology.

Figure 9:
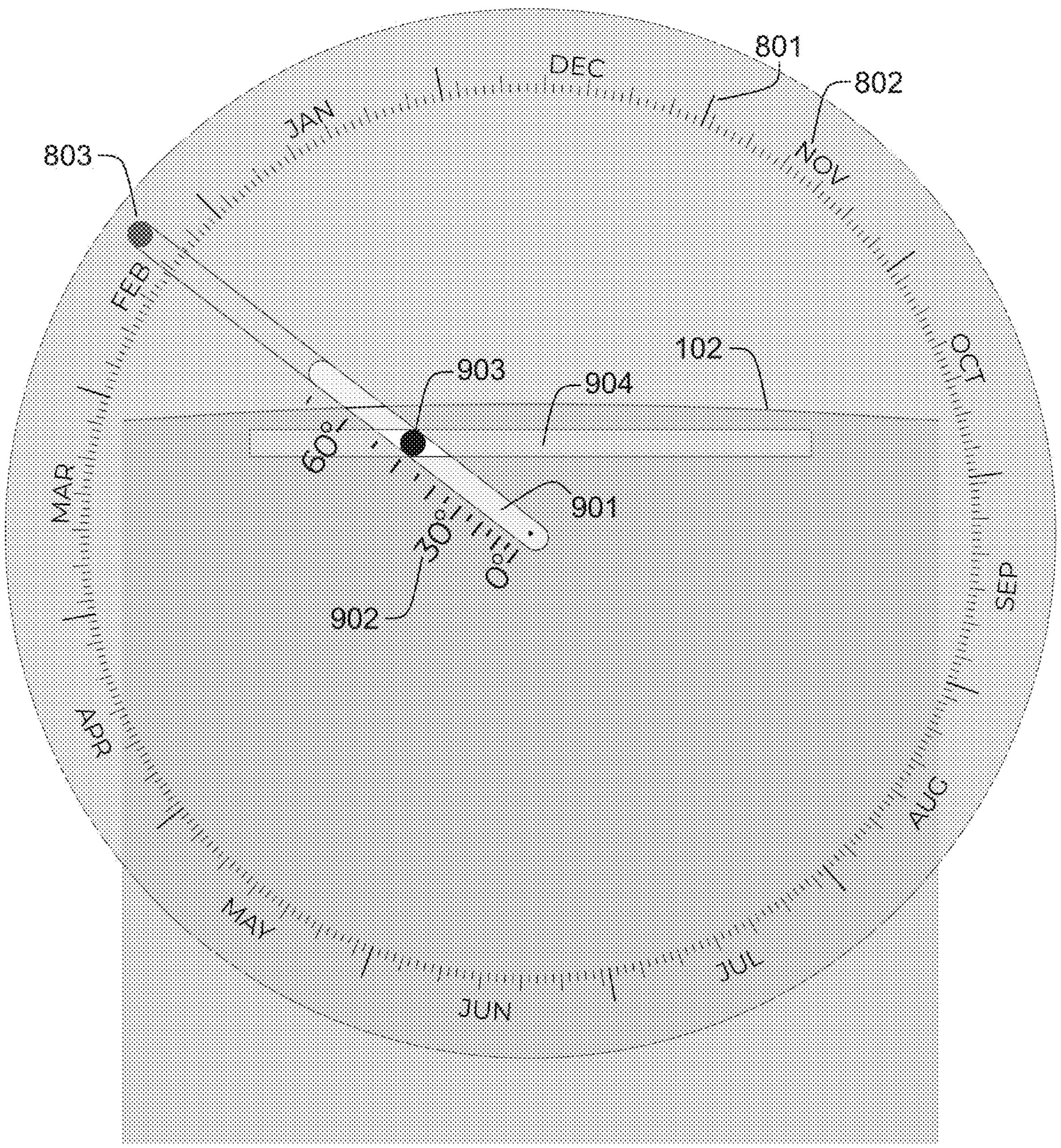
FIG. 9 is a diagram illustrating a portion of a system for graphically representing the passage of time, and including a mechanism to adjust the amplitude of the horizon's vertical translation based on the system's latitude, according to a mechanical embodiment of the present invention.

FIG. 9 is a diagram illustrating a portion of the system, and including a mechanism to adjust the amplitude of the horizon's vertical translation based on the latitude of the system's location, according to a mechanical embodiment of the present invention. Horizon 102 translates vertically in tandem with a Horizon Slot 904. A Latitude Scale 902 represents degrees north or south of the equator. Latitude Scale 902 and a Latitude Scale Slot 901, move independently from Horizon 102 and Horizon Slot 904, and rotate in tandem with revolving Earth 803. Earth 803 revolves about the center approximately once per year. A Pin 903 is set through the intersection of Horizon Slot 904 and Latitude Scale Slot 901. The vertical movement of Horizon 102 is caused by the vertical component of the rotation of Pin 903. The position of Pin 903 relative to Latitude Scale 902 identifies the latitude of the system and affects the radius of rotation of Pin 903, which results in an amplitude of annual vertical translation of Horizon 102 that is appropriate to the latitude of the system.

Figure 10A:
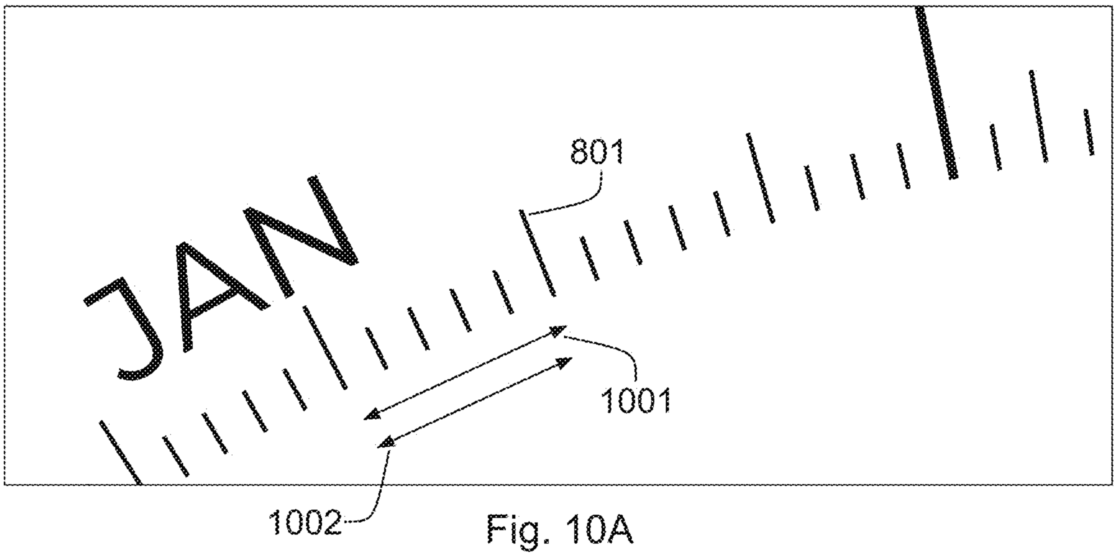
FIG. 10A and FIG. 10B are diagrams illustrating two portions of a system for graphically representing the passage of time, and describing unequal spacing of dates through the year, according to a mechanical embodiment of the present invention.
Figure 10B:
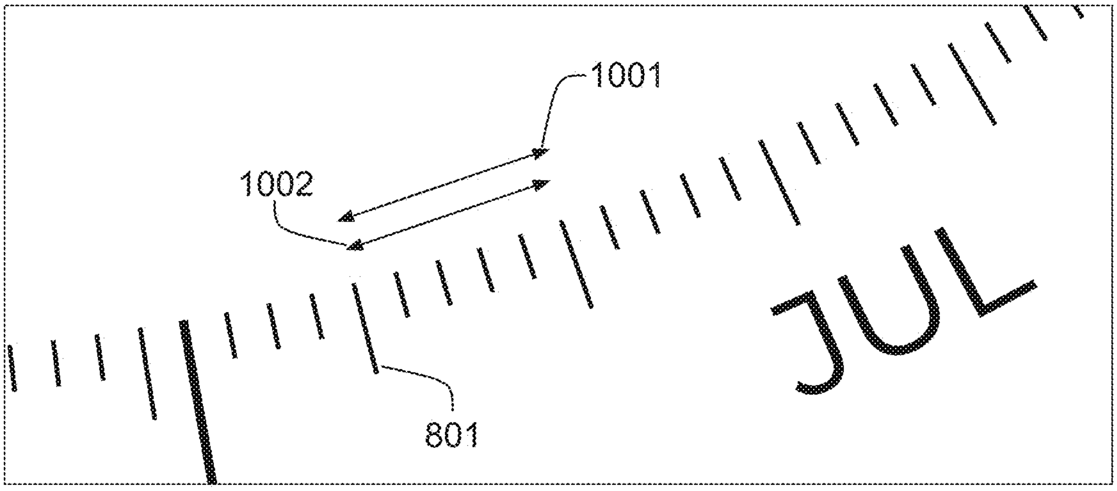

FIG. 10A and FIG. 10B are diagrams illustrating in detail two portions of the system, near the top and near the bottom of the set of circumferential Date Indications 801, according to a mechanical embodiment of the present invention. Date Indications 801 are not spaced at equal angles; rather, the varying amount of change each day in the angular position of Date Indications 801 is equal to the varying amount of change each day in the angular position of the actual earth in its orbit around the sun. To illustrate the differing spacing through the year of Date Indications 801, Distance 1001 represents the approximate distance between two dates five days apart in early January, near the earth's perigee in its orbit around the sun and Distance 1002 represents the approximate distance between two dates five days apart in early July, near the earth's apogee in its orbit around the sun. Distance 1001 is greater than Distance 1002, reflecting the greater speed and distance covered by the earth in its orbit when closest to the sun as compared with the lesser speed and distance covered by the earth in its orbit when farthest from the sun.

In a mechanical embodiment, the system effects varying daily adjustments to the amount of daily change in the angular position of the earth by employing a gear whose shape is determined by the value of one of the two components of the equation of time through the year. This is the component caused by the earth's elliptical orbit, which causes the varying speed of the earth's revolution around the sun. This gear is generally elliptical in shape, rotates approximately once per year, and causes the earth to adjust its angular position on the system to reflect the actual earth's position in its orbit through the year. This gearing is similar to an adjustment to a portion of a time display that is generated by an equation-of-time gear, and is well known to people skilled in the art of horology.

Figure 11A:
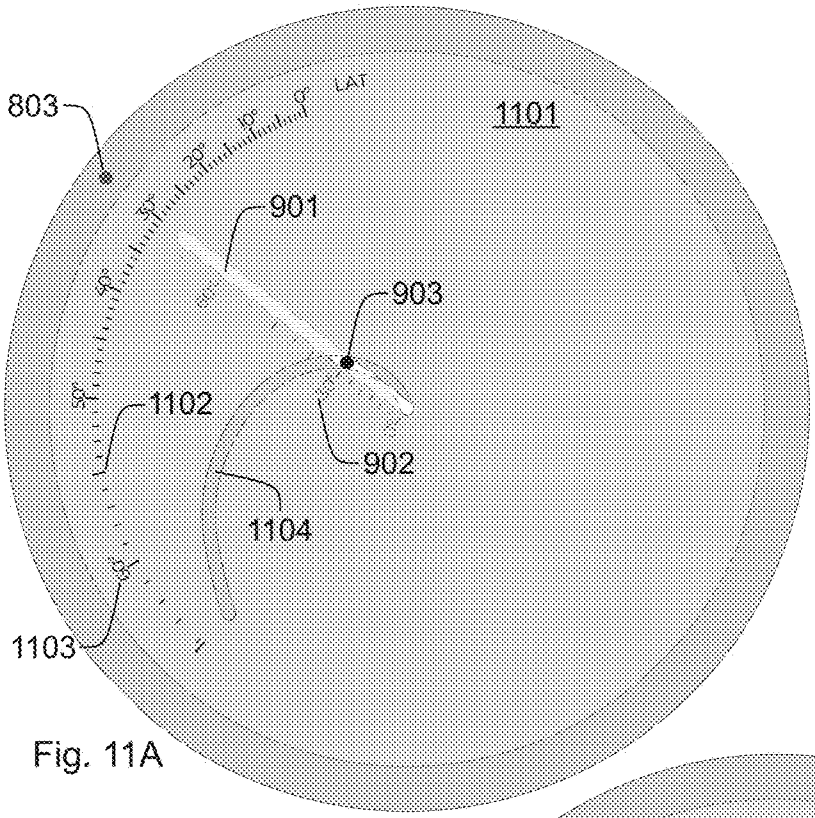
FIG. 11A and FIG. 11B are diagrams illustrating a portion of a system for graphically representing the passage of time, and including a mechanism for setting latitude, with each figure showing a specific latitude, according to a mechanical embodiment of the present invention.
Figure 11B:
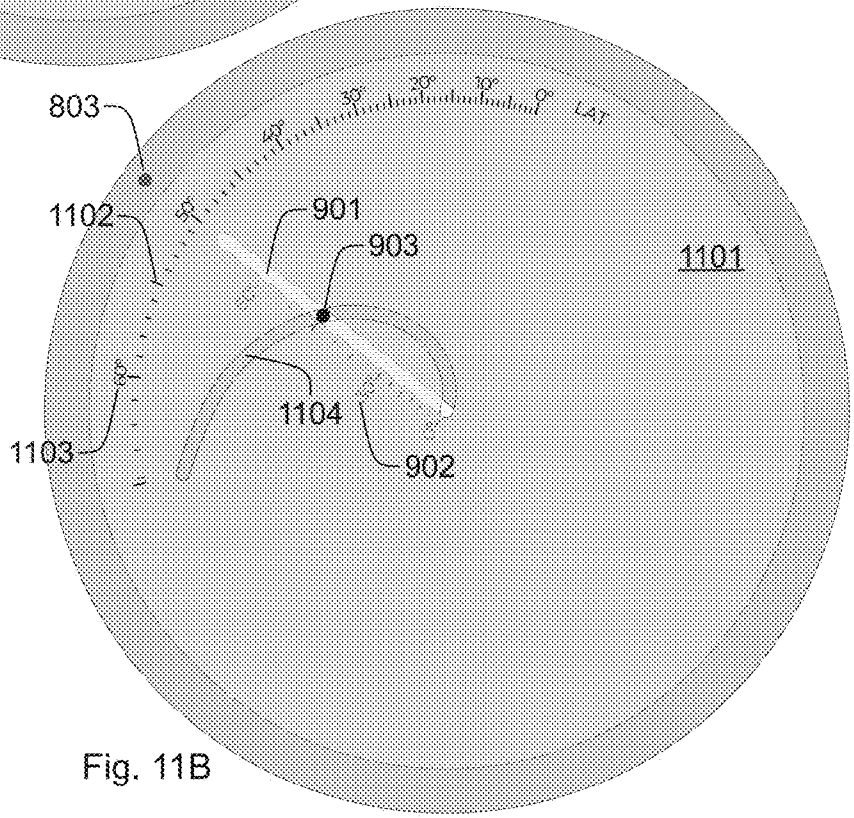

FIG. 11A and FIG. 11B are diagrams illustrating a portion of the system that describe how the setting of latitude is accomplished, according to a mechanical embodiment of the present invention. A Latitude Setting Disk 1101 includes a Spiral Slot 1104, a Latitude Setting Scale 1102, and Latitude Setting Numerals 1103. Latitude Setting Scale 1102 represents degrees north or south of the equator. Latitude Setting Disk 1101 typically rotates in tandem with Earth 803 and Latitude Scale Slot 901. Pin 903 is set through the intersection of Spiral Slot 1104 and Latitude Scale Slot 901. When the system is in the mode of setting latitude, Latitude Setting Disk 1101 moves independently from Earth 803 and Latitude Scale Slot 901. As Latitude Setting Disk 1101 is rotated—for example, from its position in FIG. 11A to its position in FIG. 11B—so that a different latitude on Latitude Setting Scale 1102 aligns with Earth 803, Pin 903 moves along Spiral Slot 1104 to a different latitude on Latitude Scale 902, matching the latitude indicated on Latitude Setting Scale 1102. Pin 903 is now at a different radius from the center of the system and will effect a different amplitude of vertical translation of Horizon 102, appropriate to the current latitude, as shown in FIG. 9. FIG. 11A illustrates a latitude setting of 30 degrees from the equator and the corresponding position of Pin 903 at a certain radius from the center. FIG. 11B illustrates a latitude setting of 50 degrees from the equator and the corresponding position of Pin 903 at a greater radius from the center than the radius of Pin 903 in FIG. 11A. This gearing allows the latitude to be set while Earth 803 is at any angular position; that is, the latitude can be set on any day of the year.

Figure 12:
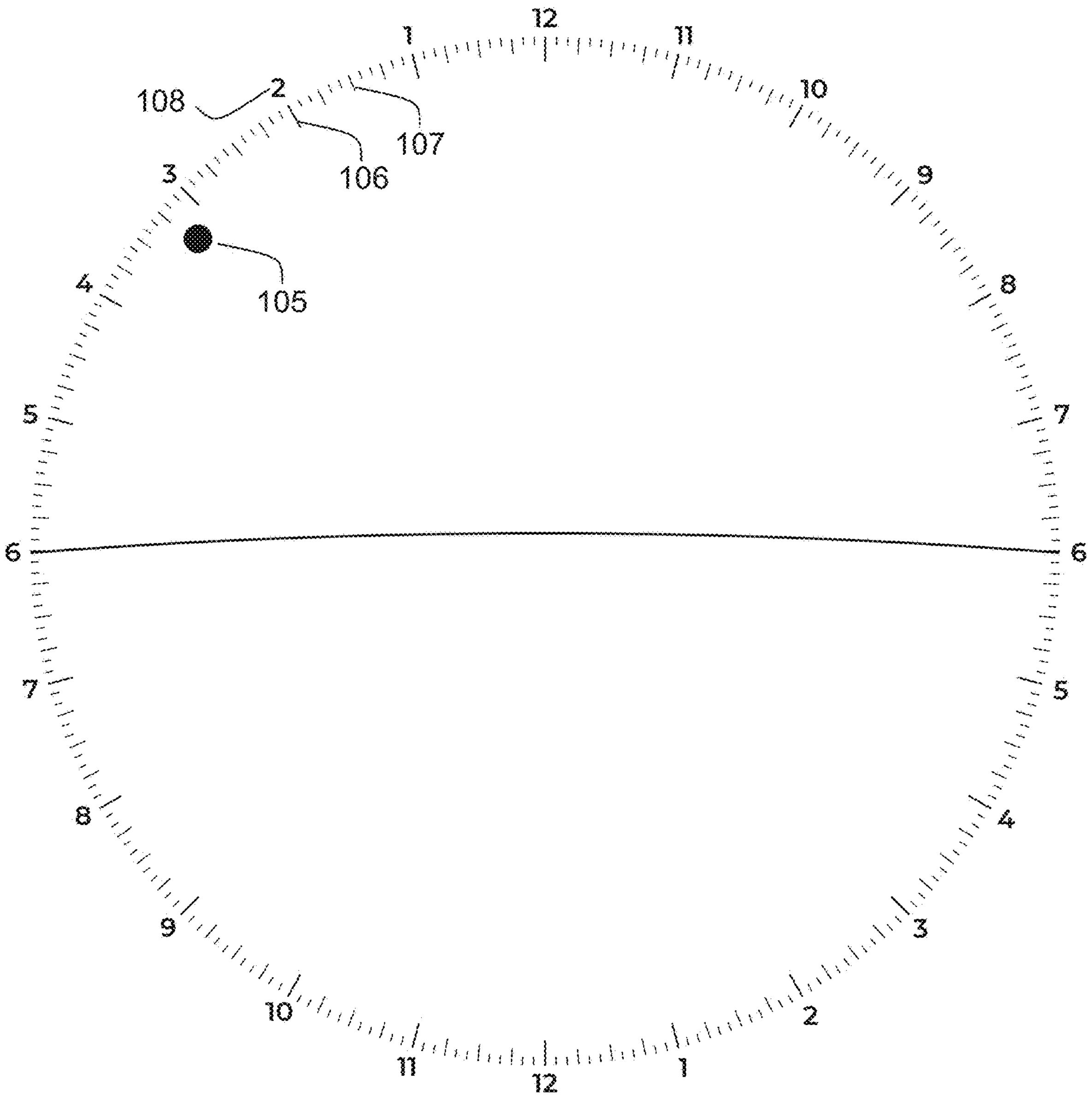
FIG. 12 is a diagram illustrating a portion of a system for graphically representing the passage of time, as experienced in the southern hemisphere, according to an embodiment of the present invention.

FIG. 12 is a diagram illustrating a portion of the system, as experienced in the Southern Hemisphere, according to an embodiment of the present invention. Hour Indications 106 and Hour Numerals 108 are ordered so that they increase in a counterclockwise direction, corresponding to the apparent motion of the sun in the Southern Hemisphere. Sun 105 revolves in a counterclockwise direction. The position of Sun 105 with respect to Hour Indications 106 and Hour Segments 107 indicates the time of day.

The disclosure includes an apparatus including a single, integrated display on the face of the apparatus for visually representing solar time and civil time simultaneously. The apparatus may also include a representation of the horizon extending horizontally across the display, an icon of the sun, which may represent solar time by its position relative to the horizon and to the top of the display, which revolves once per solar day about the center of the display, and a plurality of hour indications, which may represent civil-time hours of the day, set circumferentially around the display. In some embodiments, the angular position of the set of civil-time hour indications is rotatable, thereby enabling the civil time of solar noon to appear at the top of the display. The icon of the sun may indicate civil time by its position relative to the civil-time hour indications. In some embodiments, the position of the icon of the sun above the representation of the horizon indicates the occurrence of daytime, and the end positions of the representation of the horizon indicate the civil time of sunrise at one end and the civil time of sunset at the other end by their positions relative to the civil-time hour indications. The representation of the horizon may move up and down with an annual period coinciding with the seasons, thereby causing a progression through the year in the proportions of daytime and nighttime of each day and in the indicated civil times of sunrise and sunset for each day.

In some embodiments, the apparatus includes means for a digital portion of the apparatus, wherein the positions and movements of the icon of the sun, the clock-time hour indications, and the representation of the horizon are guided by the means of the digital portion. The apparatus may include a radially oriented graphic that is visible in daytime and in nighttime that revolves with the same angular position as the representation of the sun, thereby allowing the continuous determination of civil time by the position of the radially oriented graphic relative to the civil-time hour indications.

In some embodiments, the angular position of the civil-time hour indications is rotated to adjust for the longitude of an actual location relative to the meridian of the time zone of the actual location. The apparatus may include a dial accessible to a user, wherein the adjustment of the dial causes the setting of the longitude of the system by adjusting the angular position of the civil-time hour indications.

In some embodiments, the angular position of the clock-time hour indications is rotated to adjust for the equation of time each day. The angular position of the clock-time hour indications may be further rotated to conform to the equation of time each day. In some embodiments, during Daylight Saving Time, the angular position of the civil-time hour indications is further rotated 1/24 circle, thereby causing the civil times of sunrise, solar noon, and sunset on the apparatus to be one hour later than their civil times during Standard Time. The apparatus may include a dial accessible to a user, wherein the adjustment of the dial toggles between the setting of Daylight Saving Time and the setting of Standard Time by adjusting the angular position of the civil-time hour indications.

In some embodiments, the amplitude of vertical translation of the representation of the horizon is based on the latitude of an actual location, thereby causing the civil times of sunrise and sunset on the apparatus to vary through the year with the same magnitude of variation as the actual civil times of sunrise and sunset at the actual location. The apparatus may further include a plurality of date indications displayed circumferentially about the center and a representation of the earth's position in its orbit that revolves approximately once per year about the center of the display enabling the determination of the date by the position of the representation of the earth's position in its orbit relative to the date indications. In some embodiments, an indication of the winter solstice is at the top of the path of the representation of the earth's position in its orbit, and indications of the spring and fall equinoxes are equally spaced between the top and bottom of the path of the representation of the earth's position in its orbit, and an indication of the summer solstice is at the bottom of the path of the representation of the earth's position in its orbit. The apparatus may include an indication of each season placed circumferentially between the solstice or the equinox that begins each season and the equinox or the solstice that ends each season.

In some embodiments, the angular position of the set of date indications is slightly rotated annually to adjust for the year within the leap cycle and slightly rotated to adjust for the time zone of an actual location, thereby causing the date plus a fraction of a day of the spring equinox of the current year, as located within the date indications, to be coincident with the angular position of the indication of the spring equinox. The angular position of the representation of the earth's position in its orbit may be geared to affect the vertical position of the representation of the horizon, thereby positioning the representation of the horizon at the vertical position appropriate to the date represented by the angular position of the representation of the earth's position in its orbit.

In some embodiments, the varying magnitude of change each day in the angular position of the representation of the earth's position in its orbit is equal to the varying magnitude of change each day in the angular position of the actual earth in its orbit around the sun, thereby causing a more accurate vertical positioning of the representation of the horizon appropriate to the date represented by the angular position of the representation of the earth's position in its orbit. The apparatus may include a dial accessible to a user, wherein the adjustment of the dial may change the setting of the latitude of the apparatus by adjusting the radius of revolution of a pin around the center, wherein the vertical component of the distance of the pin from the center may be geared to affect the vertical position of the representation of the horizon.

As used herein, solar time is defined as apparent solar time, or the time as measured by direct observation of the sun, which is different at every longitude.

Civil time is defined as mean solar time, based on an average 24-hour day, or the time commonly measured by clocks, which is the same at all locations within a time zone.

Some of the components listed herein use the same number from figure to figure. It should be appreciated these components use the same numbers solely for ease of reference and to facilitate comprehension for the reader. While these components may use the same numbers, differences may be present in these components as illustrated in the various figures in which they appear and as described in the specification herein.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

The term "adjacent" may be used to mean "next to" or "adjoining." For example, the disclosure includes " . . . an indication of winter solstice is located adjacent to the top portion of the display . . . " In this context, "adjacent to the top portion of the display" means that the indication of winter solstice may be located next to or adjoining the top portion of the display.

The term "substantially" may be used to mean "completely" or "nearly completely." For example, the disclosure includes, "The representation of the horizon may extend substantially horizontally across the display . . . " In this context, "substantially horizontally" means that the representation of the horizon may extend completely or nearly completely horizontally. The representation of the horizon is not required to extend perfectly horizontally to fall within the understanding of "substantially horizontally." For example, the representation of the horizon may define a slightly arched shape, rather than a perfectly flat line, and still be considered to extend "substantially horizontally."

As used herein, solar time is defined as apparent solar time, or the time as measured by direct observation of the sun, which is different at every longitude.

Civil time is defined as mean solar time, based on an average 24-hour day, or the time commonly measured by clocks, which is the same at all locations within a time zone.

The foregoing may be accomplished through software code running in one or more processors on a communication device in conjunction with a processor in a server running complementary software code.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

It is appreciated that in order to practice the method of the foregoing as described above, it is not necessary that the processors and/or the memories of the processing machine be physically located in the same geographical place. That is, each of the processors and the memory (or memories) used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the foregoing, be performed by a single component. Further, the processing performed by one distinct component as described above may be performed by two distinct components. In a similar manner, the memory storage performed by two distinct memory portions, as described above, may, in accordance with a further embodiment of the foregoing, be performed by a single memory portion. Further, the memory storage, performed by one distinct memory portion, as described above, may be performed by two memory portions.

Further, various technologies may be used to provide communication between the various processors and/or memories, as well as to allow the processors and/or the memories of the foregoing to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the foregoing. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software may instruct the processing machine what to do with the data being processed.

Further, it is appreciated that the instructions or set of instructions used in the implementation and operation of the foregoing may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the foregoing. Illustratively, the programming language used may include assembly language, Ada, APL, Basic, C, C++, COBOL, dBase, Forth, Fortran, Java, Modula-2, Pascal, Prolog, Python, REXX, Visual Basic, and/or JavaScript, for example. Further, it is not necessary that a single type of instruction or single programming language be utilized in conjunction with the operation of the system and method of the foregoing. Rather, any number of different programming languages may be utilized as is necessary and/or desirable.

Also, the instructions and/or data used in the practice of the foregoing may utilize any compression or encryption technique or algorithm, as may be desired. An encryption module might be used to encrypt data. Further, files or other data may be decrypted using a suitable decryption module, for example.

As described above, the foregoing may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the foregoing may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the foregoing.

Further, the memory or memories used in the processing machine that implements the foregoing may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the foregoing, a variety of "user interfaces" may be utilized to allow a user to interface with the processing machine or machines that are used to implement the foregoing. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the foregoing, it is not necessary that a human user actually interact with a user interface used by the processing machine of the foregoing. Rather, it is also contemplated that the user interface of the foregoing might interact, i.e., convey and receive information, with another processing machine, rather than a human user. Accordingly, the other processing machine might be characterized as a user. Further, it is contemplated that a user interface utilized in the system and method of the foregoing may interact partially with another processing machine or processing machines, while also interacting partially with a human user.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

I claim:

1. An apparatus comprising a display for visually representing solar time and civil time simultaneously, the apparatus comprising:

a representation of a horizon extending across the display;

an icon of the sun corresponding to a solar time by its position relative to the representation of the horizon and to a top portion of the display, the icon of the sun configured to revolve once per solar day about a center portion of the display; and a plurality of hour indications corresponding to civil-time hours of a day, the plurality of hour indications defining a perimeter that is set circumferentially around the display, wherein an angular position of the plurality of hour indications is rotatable, thereby enabling the civil time of solar noon to appear continuously at a top of the perimeter, wherein the top of the perimeter is located above a center point of the representation of the horizon.

2. The apparatus of claim 1, wherein the icon of the sun indicates civil time by its position relative to the plurality of hour indications, and when the icon of the sun is located above the representation of the horizon, the apparatus indicates daytime.

3. The apparatus of claim 2, wherein the representation of the horizon extends substantially horizontally across the display and defines a first end and a second end located opposite the first end, wherein a position of the first end relative to the plurality of hour indications corresponds to the civil time of sunrise, and a position of the second end relative to the plurality of hour indications corresponds to the civil time of sunset.

4. The apparatus of claim 3, further comprising a bottom portion of the display located opposite the top portion of the display, wherein the area between the representation of the horizon and the top portion of the display relative to the area between the representation of the horizon and the bottom portion of the display represents a proportion of daytime to nighttime each day, and wherein the representation of the horizon moves toward the top portion of the display, reverses direction, and moves toward the bottom portion of the display within an annual period, thereby causing a progression through a year in the proportion of daytime to nighttime of each day depicted on the display and in the indicated civil times of sunrise and sunset for each day.

5. The apparatus of claim 4, further comprising a means for a digital portion of the apparatus, wherein positions and movements of the icon of the sun, the plurality of hour indications, and the representation of the horizon are guided by the means of the digital portion.

6. The apparatus of claim 4, wherein the amplitude of vertical translation of the representation of the horizon is based on the latitude of an actual location, thereby causing the civil times of sunrise and sunset on the apparatus to vary through a year with the same magnitude of variation as the actual civil times of sunrise and sunset at the actual location.

7. The apparatus of claim 6, further comprising:

a plurality of date indications displayed circumferentially about the center portion of the display; and a representation of earth's position in its orbit that corresponds to a date by its position relative to the plurality of date indications, the representation of earth's position in its orbit configured to revolve approximately once per year about the center portion of the display.

8. The apparatus of claim 7, wherein an indication of winter solstice is located adjacent to the top portion of the display, wherein an indication of spring equinox and an indication of fall equinox are each at an angular position that is substantially equally spaced between the top portion of the display and the bottom portion of the display, wherein the indication of spring equinox is located opposite the indication of fall equinox, and wherein an indication of summer solstice is located adjacent to the bottom portion of the display.

9. The apparatus of claim 8, wherein a label of each season is placed circumferentially between the solstice or the equinox that begins each season and the equinox or the solstice that ends each season.

10. The apparatus of claim 8, wherein an angular position of the plurality of date indications is slightly rotated annually to adjust for a year within a leap cycle, and is slightly rotated to adjust for the time zone of an actual location, thereby causing the date plus fraction of a day of the spring equinox of a current year, as located within the plurality of date indications, to be coincident with the angular position of the indication of spring equinox.

11. The apparatus of claim 7, wherein an angular position of the representation of the earth's position in its orbit is geared to affect a vertical position of the representation of the horizon, thereby positioning the representation of the horizon at the vertical position appropriate to a date represented by the angular position of the representation of the earth's position in its orbit.

12. The apparatus of claim 11, wherein the varying magnitude of change each day in the angular position of the representation of earth's position in its orbit is equal to the varying magnitude of change each day in the angular position of the earth in its orbit around the sun, thereby causing a more accurate vertical positioning of the representation of the horizon appropriate to a date represented by the angular position of the representation of the earth's position in its orbit.

13. The apparatus of claim 11, further comprising a dial accessible to a user, wherein adjusting the dial changes a setting of a latitude of the apparatus by adjusting a radius of revolution of a pin around the center portion of the display, wherein the vertical component of a distance of the pin from the center portion of the display is geared to affect a vertical position of the representation of the horizon.

14. The apparatus of claim 1, further comprising a radially oriented graphic that is visible in daytime and in nighttime, the radially oriented graphic configured to revolve with a position that is substantially the same angular position as the icon of the sun, thereby allowing continuous determination of civil time by the position of the radially oriented graphic relative to the plurality of hour indications.

15. The apparatus of claim 1, wherein the angular position of the plurality of hour indications is rotated to adjust for the longitude of an actual location relative to the meridian of the time zone corresponding to the actual location.

16. The apparatus of claim 15, further comprising a dial accessible to a user, wherein adjusting the dial sets the longitude of the apparatus by adjusting the angular position of the plurality of hour indications.

17. The apparatus of claim 15, wherein the angular position of the plurality of hour indications is further rotated to conform to the equation of time each day.

18. The apparatus of claim 17, wherein during Daylight Saving Time the angular position of the plurality of hour indications is further rotated 1/24 circle, thereby causing the civil times of sunrise, solar noon, and sunset on the apparatus to be one hour later than their civil times during Standard Time.

19. The apparatus of claim 18, further comprising a dial accessible to a user, wherein adjusting the dial moves between a Daylight Saving Time setting and a Standard Time setting by adjusting the angular position of the plurality of hour indications.

20. The apparatus of claim 1, wherein the angular position of the plurality of hour indications is rotated to adjust for the equation of time each day.

* * * * *